(12) United States Patent
Takeshita

(10) Patent No.: US 12,095,979 B2
(45) Date of Patent: Sep. 17, 2024

(54) EVALUATION SYSTEM, AND EVALUATION MANAGEMENT METHOD

(71) Applicant: JVCKENWOOD Corporation, Yokohama (JP)

(72) Inventor: Hiroshi Takeshita, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 65 days.

(21) Appl. No.: 18/102,608

(22) Filed: Jan. 27, 2023

(65) Prior Publication Data

US 2023/0179758 A1    Jun. 8, 2023

Related U.S. Application Data

(63) Continuation of application No. PCT/JP2021/021540, filed on Jun. 7, 2021.

(30) Foreign Application Priority Data

Aug. 25, 2020 (JP) .................................. 2020-141723
Aug. 25, 2020 (JP) .................................. 2020-141724

(51) Int. Cl.
H04N 17/00 (2006.01)
G06T 7/00 (2017.01)
G09G 3/00 (2006.01)

(52) U.S. Cl.
CPC ........... *H04N 17/00* (2013.01); *G06T 7/0004* (2013.01); *G06T 2207/30121* (2013.01); *G06T 2207/30168* (2013.01)

(58) Field of Classification Search
CPC .... G09G 3/2092; G09G 3/2096; G09G 3/006; H04N 17/00; H04N 17/04; G06T 7/0004; G06T 2207/30121; G06T 2207/30168
See application file for complete search history.

(56) References Cited

U.S. PATENT DOCUMENTS 5,918,192 A *  6/1999  Tomaszewski  ...... H04N 17/002
                                                 348/333.01
8,175,531 B2 * 5/2012  Rekimoto  ............. G06F 1/1613
                                                 455/552.1
(Continued)

FOREIGN PATENT DOCUMENTS

JP    2019-149767 A    9/2019
JP    2020-003694 A    1/2020

OTHER PUBLICATIONS

International Search Report for related International Application No. PCT/JP2021/021540, mailed Aug. 24, 2021 (5 pages).

*Primary Examiner* — Brian P Yenke
(74) *Attorney, Agent, or Firm* — Procopio, Cory, Hargreaves & Savitch LLP

(57) ABSTRACT

A monitor accuracy management system includes a monitor apparatus and a tablet terminal. The monitor apparatus includes a generation unit configured to generate a display pattern that is based on identification information and a display control unit configured to display the generated display pattern on a display screen. The tablet terminal includes an outward-facing camera which is disposed on a surface of a housing and which is configured to capture the display pattern displayed on the display screen in a state with the surface of the housing placed onto the display screen of the monitor apparatus, an acquisition unit configured to acquire identification information of the monitor apparatus based on the captured display pattern, an identification unit configured to use the acquired identification information to identify the monitor apparatus to be managed, and an evaluation unit configured to evaluate the image quality of the identified monitor apparatus.

4 Claims, 15 Drawing Sheets

(56) References Cited

U.S. PATENT DOCUMENTS

| | | | |
|---|---|---|---|
| 9,554,044 B2* | 1/2017 | Imoto | H04N 25/60 |
| 10,205,940 B1* | 2/2019 | Baldwin | H04N 1/6052 |
| 10,408,858 B2* | 9/2019 | Yang | G09G 3/006 |
| 10,638,125 B1* | 4/2020 | Lu | G06T 7/0004 |
| 10,692,413 B2* | 6/2020 | Chen | G01J 3/0289 |
| 10,735,630 B2* | 8/2020 | Hirotsune | G01J 1/42 |
| 10,769,817 B2* | 9/2020 | Cook | G09G 3/006 |
| 11,206,393 B2* | 12/2021 | Lee | G09G 3/006 |
| 11,375,084 B2* | 6/2022 | Maekawa | G09G 3/006 |
| 11,470,293 B2* | 10/2022 | Park | G01J 3/0272 |
| 11,538,390 B2* | 12/2022 | Higashikawa | G09G 3/006 |
| 11,763,728 B2* | 9/2023 | Kimura | G09G 3/2096 345/173 |
| 11,783,683 B2* | 10/2023 | Takeshita | G08B 5/38 340/331 |
| 11,854,455 B2* | 12/2023 | Kim | G09G 3/2007 |
| 2015/0035994 A1* | 2/2015 | Son | H04N 17/04 348/189 |
| 2015/0169085 A1* | 6/2015 | Ida | H04N 21/4126 345/156 |
| 2015/0317928 A1* | 11/2015 | Safaee-Rad | G09G 3/006 345/593 |
| 2016/0153916 A1* | 6/2016 | Lin | G06T 7/001 348/86 |
| 2016/0261860 A1* | 9/2016 | Gu | G09G 3/006 |
| 2018/0033361 A1* | 2/2018 | Cichonski | G09G 3/006 |
| 2018/0234677 A1* | 8/2018 | Lin | G09G 5/006 |
| 2019/0268590 A1 | 8/2019 | Kato et al. | |
| 2019/0318675 A1* | 10/2019 | Chen | H04N 17/004 |
| 2019/0373206 A1* | 12/2019 | Kang | H04N 5/57 |
| 2019/0385301 A1* | 12/2019 | Li | G09G 3/3406 |
| 2020/0005693 A1 | 1/2020 | Furihata et al. | |
| 2020/0074615 A1* | 3/2020 | Nabavi | H04N 23/64 |
| 2020/0221166 A1* | 7/2020 | Park | G06F 3/044 |
| 2020/0242985 A1* | 7/2020 | Cho | G06F 1/1637 |
| 2021/0398464 A1* | 12/2021 | Katrib | G06T 7/0002 |
| 2022/0076607 A1* | 3/2022 | Kim | G09G 3/2007 |
| 2022/0084447 A1* | 3/2022 | Kishimoto | H04N 17/04 |
| 2023/0089650 A1* | 3/2023 | Park | G09G 3/20 345/1.3 |

\* cited by examiner

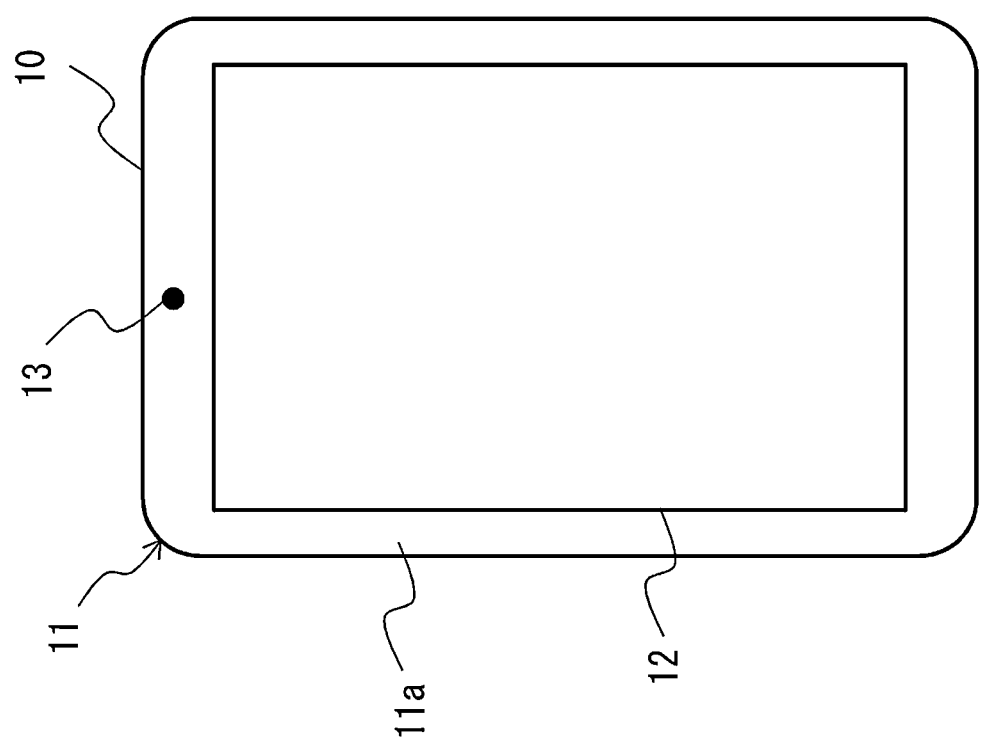

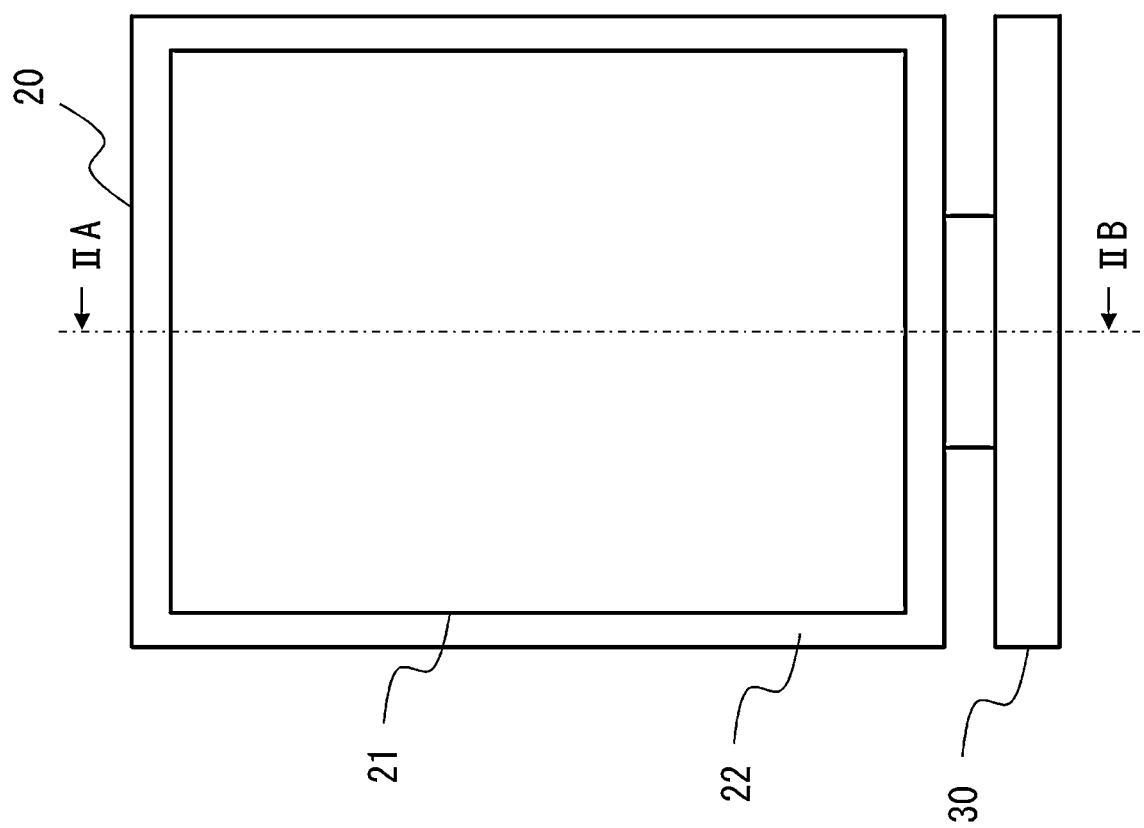

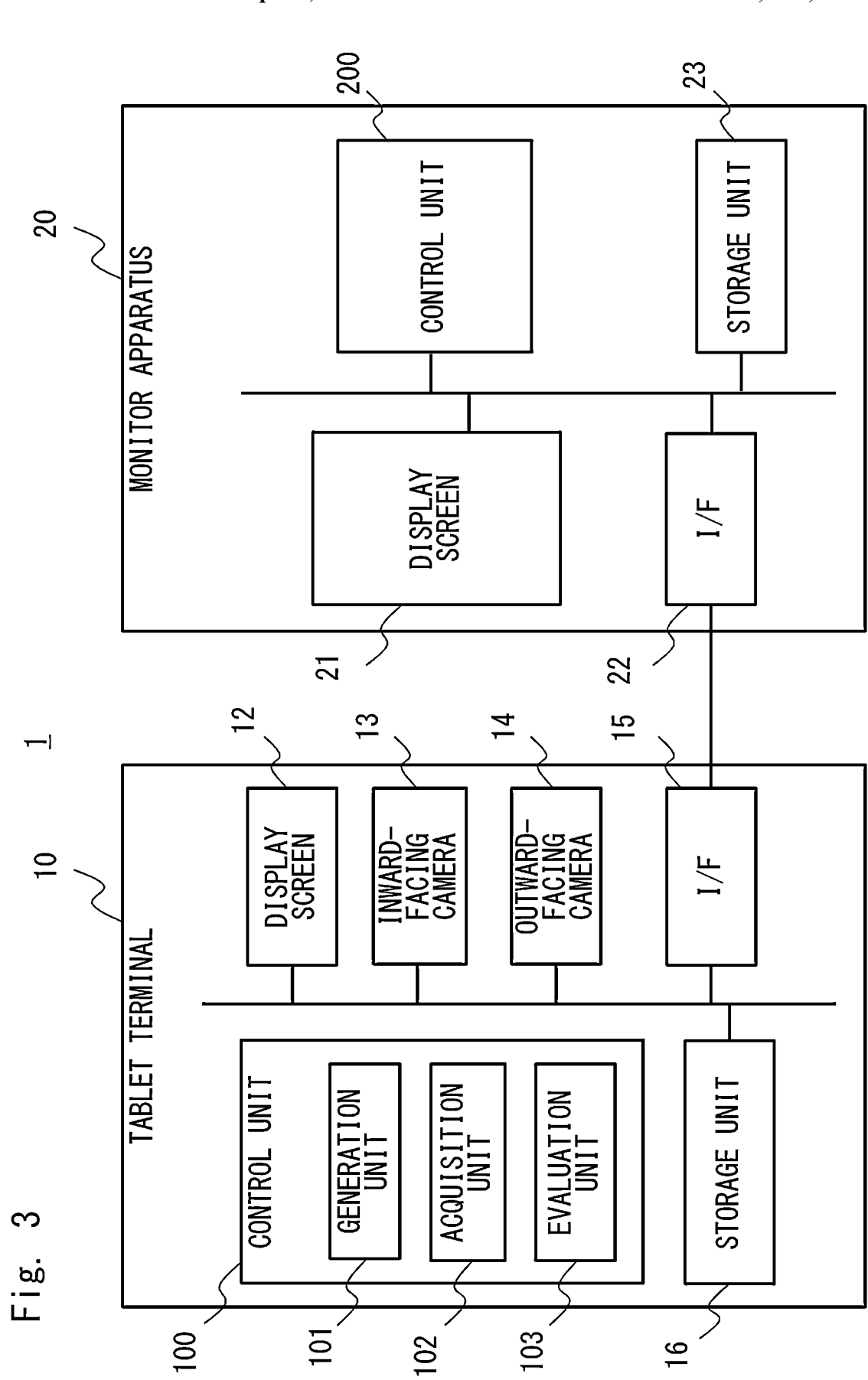

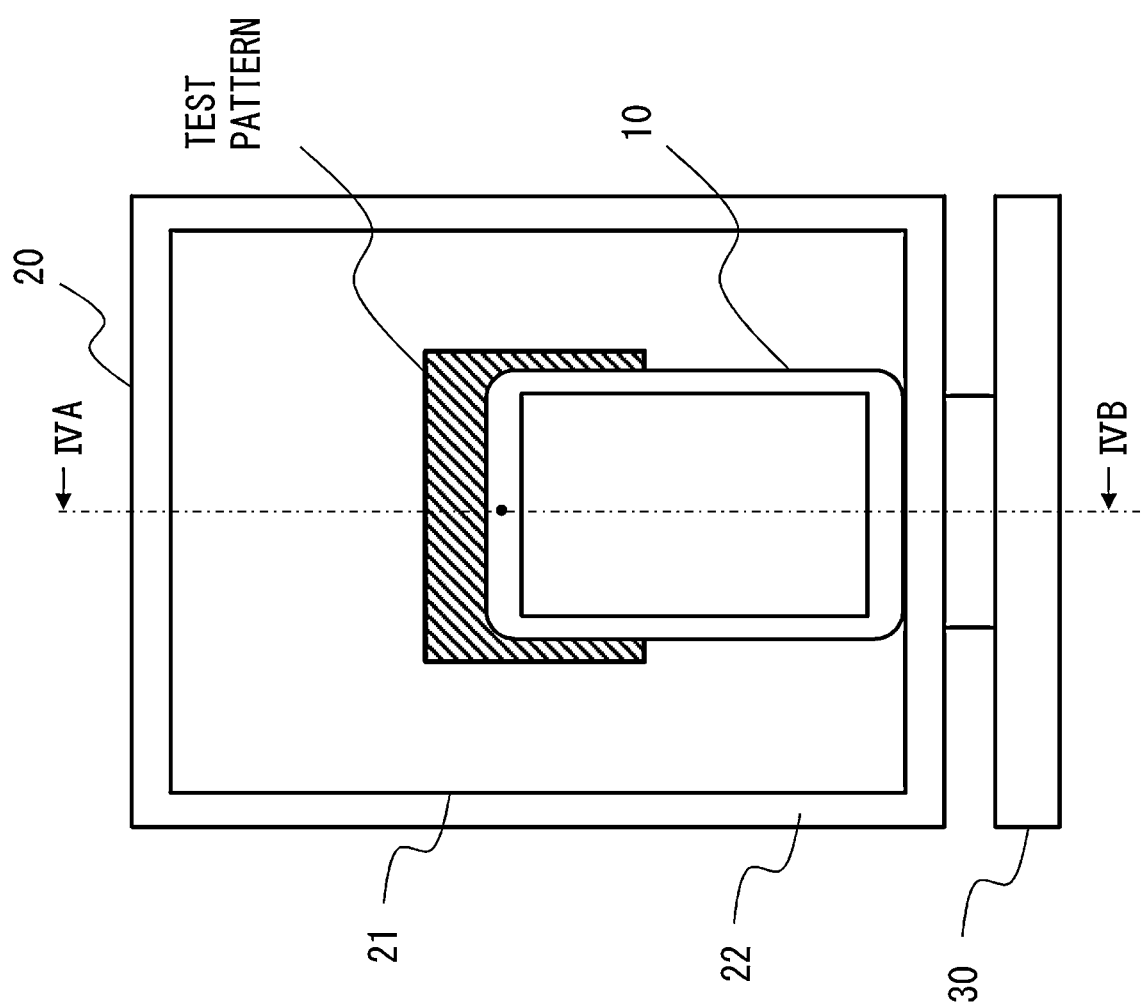

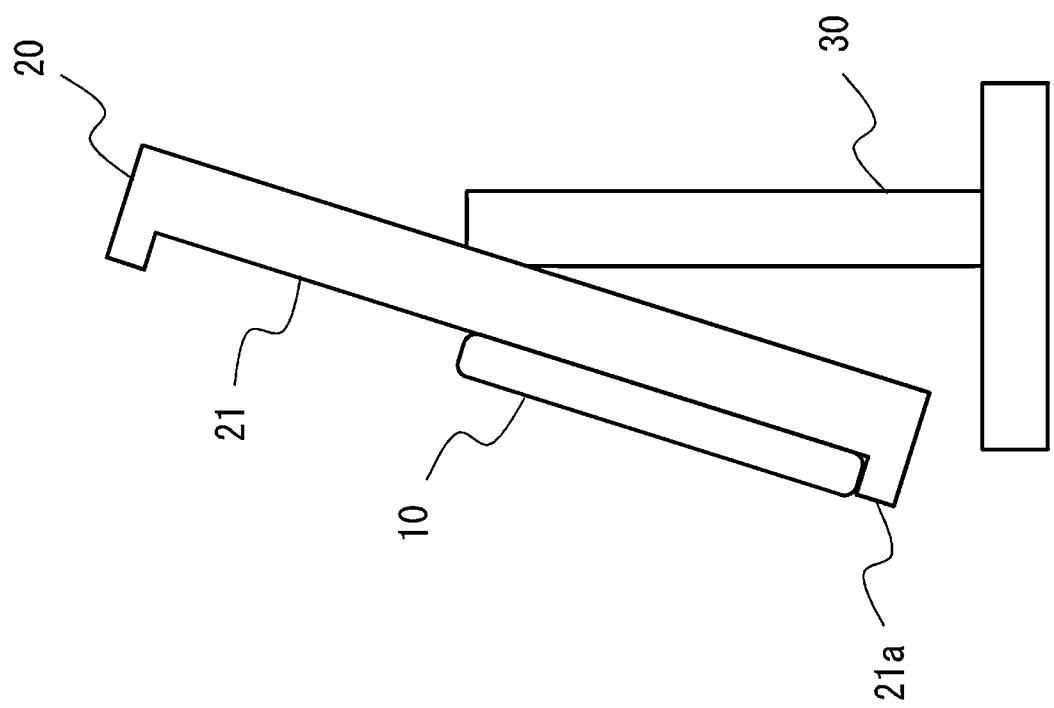

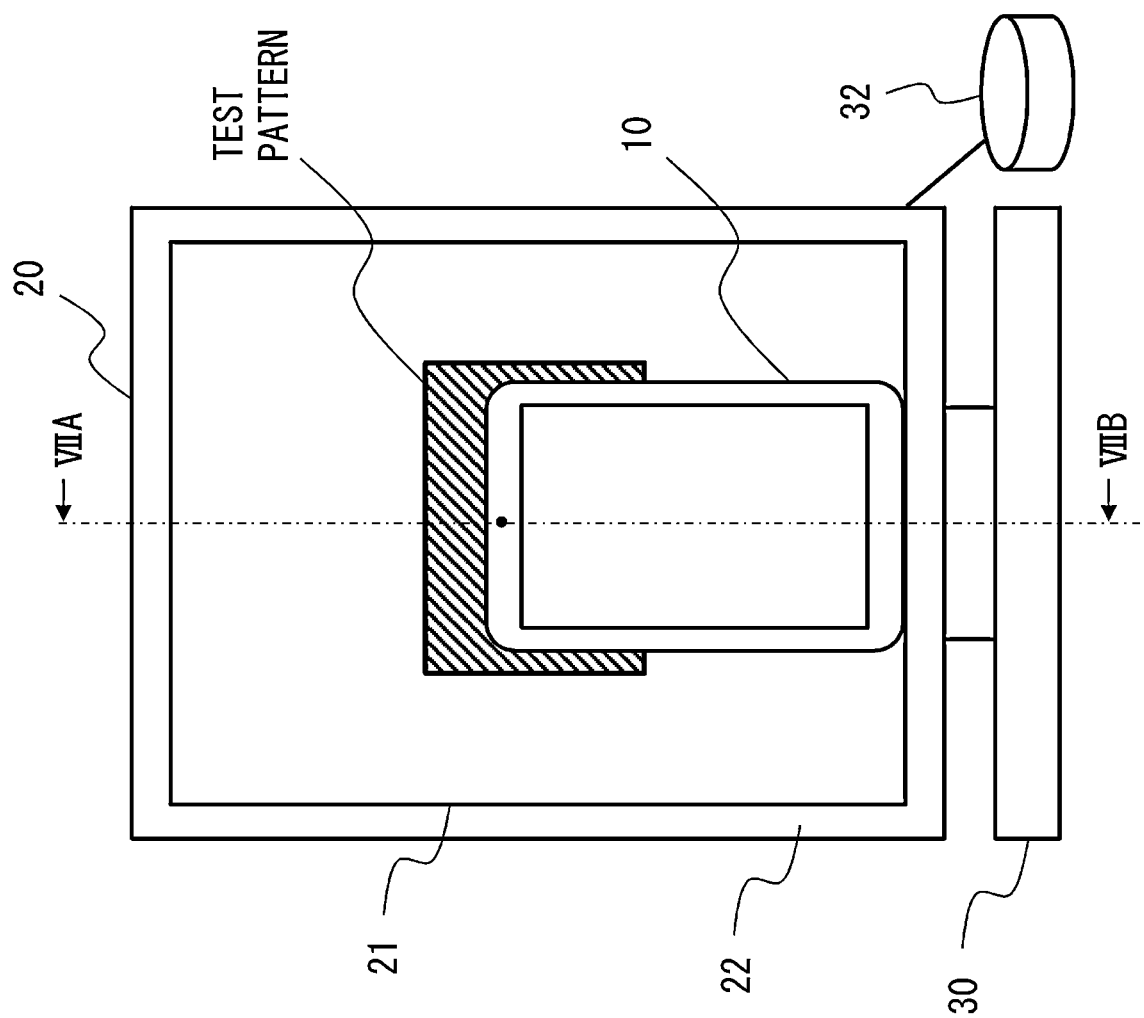

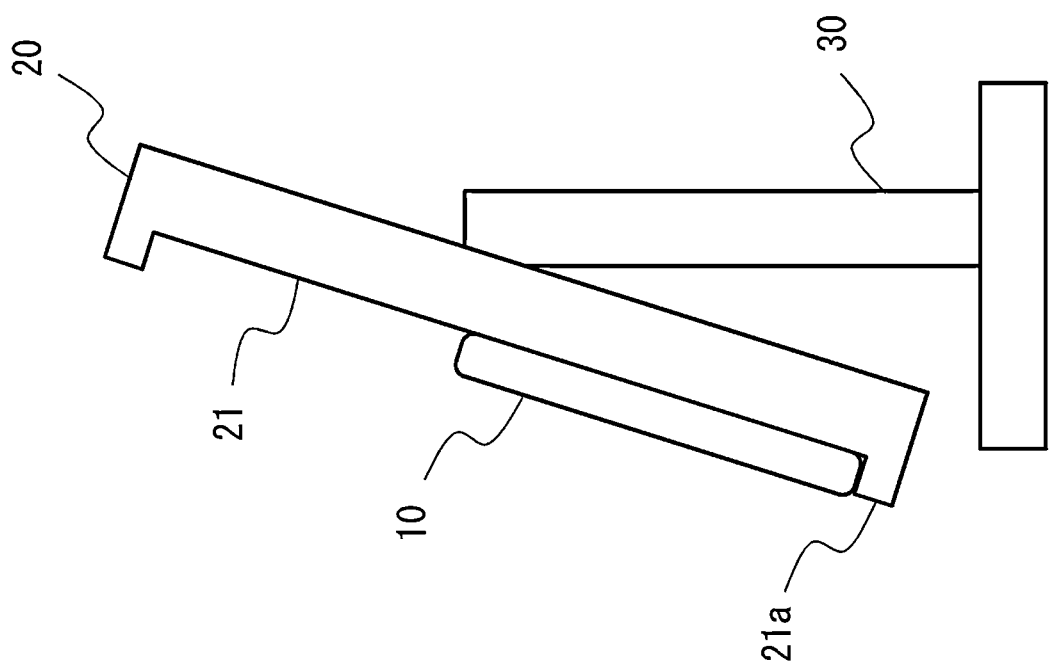

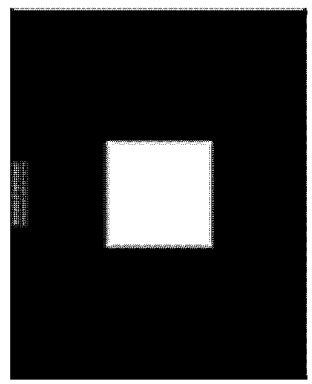
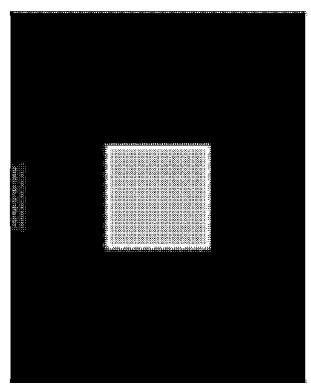
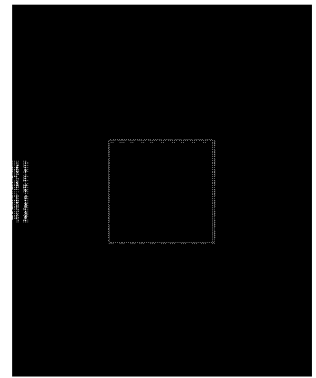
Fig. 8

EVALUATION SYSTEM, AND EVALUATION MANAGEMENT METHOD

CROSS REFERENCE TO RELATED APPLICATION

This application is based upon and claims the benefit of priority from Japanese patent application No. 2020-141724, filed on Aug. 25, 2020, and Japanese patent application No. 2020-141723, filed on Aug. 25, 2020, the disclosures of which are incorporated herein in its entirety by reference.

BACKGROUND

The present invention relates to an evaluation system, an evaluation management method, a terminal apparatus, and an evaluation method.

In recent years, display apparatuses have become increasingly high-definition and diversified, and depending on the use or the like, it may be desirable to display an image with a desired image quality on a display apparatus. A related monitor apparatus for a personal computer (PC) has a function allowing for adjustment to a desired image quality by varying the display characteristics. Display apparatuses having such a function for adjusting and evaluating image quality are being used as medical monitors for the interpretation of medical images and as desktop publishing (DTP) monitors for the design of printed materials and the like, for example.

Japanese Unexamined Patent Application Publication No. 2020-003694 is known as a related technology, for example. Japanese Unexamined Patent Application Publication No. 2020-003694 discloses a technology for measuring the brightness and color of a display screen of a display apparatus with a luminance sensor, and adjusting the image quality of the display screen according to the measurement result.

SUMMARY

As above, according to the technology disclosed in Japanese Unexamined Patent Application Publication No. 2020-003694, the image quality of a display apparatus can be evaluated by using a luminance sensor. However, in the technology disclosed in Japanese Unexamined Patent Application Publication No. 2020-003694, a special-purpose external sensor to be externally connected to the display apparatus or a PC is necessary as the sensor for measuring the luminance of the display screen. Consequently, in the technology disclosed in Japanese Unexamined Patent Application Publication No. 2020-003694, there is a problem in that identifying the display apparatus is difficult in the case of evaluating the image quality of the display apparatus without using a special-purpose external sensor. Moreover, in the technology disclosed in Japanese Unexamined Patent Application Publication No. 2020-003694, there is a problem in that the image quality of a display apparatus cannot be evaluated without using a special-purpose external sensor.

The embodiments provide an evaluation system including a display apparatus and a terminal apparatus, the display apparatus including: a generation unit configured to generate a display pattern that is based on identification information of the display apparatus; and a display unit configured to display the generated display pattern on a display screen, the terminal apparatus including: an image capture unit which is disposed on a surface of a housing of the terminal apparatus and which is configured to capture the display pattern displayed on the display screen in a state with the surface of the housing placed onto the display screen of the display apparatus; an acquisition unit configured to acquire the identification information of the display apparatus based on the captured display pattern; an identification unit configured to use the acquired identification information to identify the display apparatus to be managed; and an evaluation unit configured to evaluate the image quality of the identified display apparatus based on a predetermined image captured by the image capture unit.

The embodiments provide an evaluation management method for an evaluation system including a display apparatus and a terminal apparatus, in which the display apparatus: generates a display pattern that is based on identification information of the display apparatus; and displays the generated display pattern on a display screen, and the terminal apparatus: captures, with an image capture unit disposed on a surface of a housing of the terminal apparatus, the display pattern displayed on the display screen in a state with the surface of the housing placed onto the display screen of the display apparatus; acquires the identification information of the display apparatus based on the captured display pattern; uses the acquired identification information to identify the display apparatus to be managed; and evaluates the image quality of the identified display apparatus based on a predetermined image captured by the image capture unit.

The embodiments provide a terminal apparatus that evaluates the image quality of a display apparatus, the terminal apparatus including: a wireless communication unit that wirelessly transmits to the display apparatus a video signal for displaying a predetermined image; an image capture unit which is disposed on a surface of a housing of the terminal apparatus and which captures the predetermined image displayed on the display screen based on the video signal, in a state with the surface of the housing placed in a position facing the display screen of the display apparatus; and an evaluation unit that evaluates the image quality of the display apparatus based on the captured predetermined image.

The embodiments provide an evaluation method by which a terminal apparatus evaluates the image quality of a display apparatus, the evaluation method including: wirelessly transmitting to the display apparatus a video signal for displaying a predetermined image; capturing, with an image capture unit disposed on a surface of a housing of the terminal apparatus, the predetermined image displayed on the display screen based on the video signal, in a state with the surface of the housing placed in a position facing the display screen of the display apparatus; and evaluating the image quality of the display apparatus based on the captured predetermined image.

BRIEF DESCRIPTION OF THE DRAWINGS

FIG. 1A is a front exterior view illustrating an exterior configuration of a tablet terminal according to a first embodiment.

FIG. 2A is a front exterior view illustrating an exterior configuration of a monitor apparatus according to the first embodiment.

FIG. 3 is a configuration diagram illustrating a configuration of a monitor accuracy management system according to the first embodiment.

FIG. 4A is a front exterior view of a monitor apparatus for explaining a monitor accuracy management method according to the first embodiment.

FIG. 4B is a cross section of a monitor apparatus for explaining a monitor accuracy management method according to the first embodiment.

FIG. 7A is a front exterior view of a monitor apparatus for explaining a monitor accuracy management method according to the second embodiment.

FIG. 7B is a cross section of a monitor apparatus for explaining a monitor accuracy management method according to the second embodiment.

FIG. 8 is a diagram illustrating an example of test patterns used in a monitor accuracy management method according to the second embodiment.

DETAILED DESCRIPTION

Figure 1B:
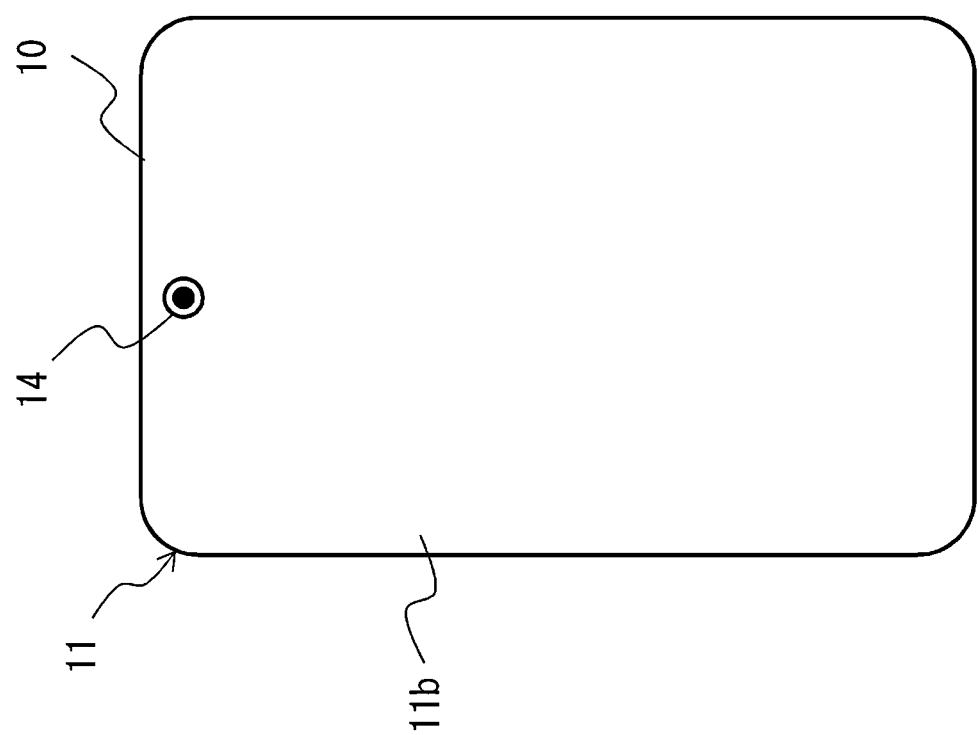
FIG. 1B is a back exterior view illustrating an exterior configuration of a tablet terminal according to the first embodiment.

Hereinafter, embodiments will be described with reference to the drawings. In the drawings, like elements are denoted with like signs, and a duplicate description of such elements is omitted where appropriate.

First Embodiment

First, the first embodiment will be described. In the present embodiment, an example of using a tablet terminal to perform monitor accuracy management is described. Note that "monitor accuracy management" or "monitor display accuracy management" refers to measuring the luminance or the like of a display screen of a monitor apparatus, evaluating and managing the image quality of the monitor apparatus, and if necessary, adjusting the image quality based on the evaluation result. In the present embodiment, the image quality of a monitor apparatus is evaluated as an example of monitor accuracy management, but the image quality of the monitor apparatus may also be adjusted.

Overview of First Embodiment

As above, in the related technology, a special-purpose external sensor to be externally connected to a monitor apparatus or a PC is necessary for measuring the luminance and the like of the monitor apparatus. Since the special-purpose external sensor unit is a piece of equipment separate from the monitor apparatus itself, the need for individual management is a problem. Also, since the special-purpose external sensor is typically expensive, possessing a number of sensors equal to the number of monitor apparatuses in possession is difficult, and it is common practice to share a small number of sensors among a plurality of monitor apparatuses. For this reason, there is a problem in that, when performing monitor accuracy management work with respect to medical monitors used for interpretation, a burden occurs in connecting the special-purpose external sensor to the monitor apparatus or PC in question every time. Furthermore, when measuring a display screen with the special-purpose external sensor, the measuring part of the sensor must be mounted correctly in close contact with a prescribed position on the display screen of the monitor apparatus. This is also the cause of a burden imposed in the user in the use of the special-purpose external sensor. Accordingly, in the present embodiment, the above problems can be addressed by using a built-in camera of a tablet terminal.

Configuration of First Embodiment

FIG. 1A is a front exterior view of a tablet terminal 10 according to the present embodiment, and FIG. 1B is a back exterior view of the same. The tablet terminal 10 according to the present embodiment is a tablet terminal on which monitor accuracy management software (an evaluation function) is installed, and the exterior form is similar to that of a typical tablet terminal. Note that the tablet terminal 10 is an example of a tablet-style terminal apparatus, and may also be a smartphone, a mobile phone, or the like insofar as the shape and functionality are similar.

As illustrated in FIGS. 1A and 1B, the tablet terminal 10 is provided with a thin housing 11 that is rectangular as seen from the front or the back. The housing 11 has front and back surfaces having flat, planar shapes, and houses various hardware internally. The size of the housing 11, or in other words the size of the tablet terminal 10, is similar to that of a typical tablet terminal, and is for example a size that houses a display screen of around 10 inches with a thickness less than or equal to 1 cm, but is not particularly limited.

A display screen 12 and an inward-facing camera 13 are provided on a front 11a (surface) of the housing 11, while an outward-facing camera 14 is provided on a back 11b (surface) of the housing 11. The display screen 12 is a flat display panel (display unit) such as a liquid crystal display (LCD) panel or an organic light-emitting diode (OLED) panel. For example, the display screen 12 has a size close to the front 11a of the housing 11 and is disposed in the center of the front 11a of the housing 11. Note that the entirety of the front 11a of the housing 11 may treated as the display screen 12, and the inward-facing camera 13 may be disposed on an end of the display screen 12.

The inward-facing camera 13 and the outward-facing camera 14 are image capture units such as charge-coupled device (CCD) cameras or complementary metal-oxide-semiconductor (CMOS) cameras. The inward-facing camera 13 is disposed at any position on the perimeter (bezel) of the front 11a of the housing 11, and for example, is disposed in the center of the perimeter on one of the short sides. The outward-facing camera 14 is disposed at any position near the perimeter of the back 11b of the housing 11, and for example, is disposed in the center of the perimeter on the same short side as the inward-facing camera 13. For example, the outward-facing camera 14 is capable of capturing images of higher image quality than the inward-facing camera 13, but is not particularly limited. The user can use the tablet terminal 10 installed or held in any orientation. In the present embodiment, either of the inward-facing camera 13 and the outward-facing camera 14 may be used, and the inward-facing camera 13 and the outward-facing camera 14 may be used while being fixed in either of the vertical and horizontal orientations.

Figure 2B:
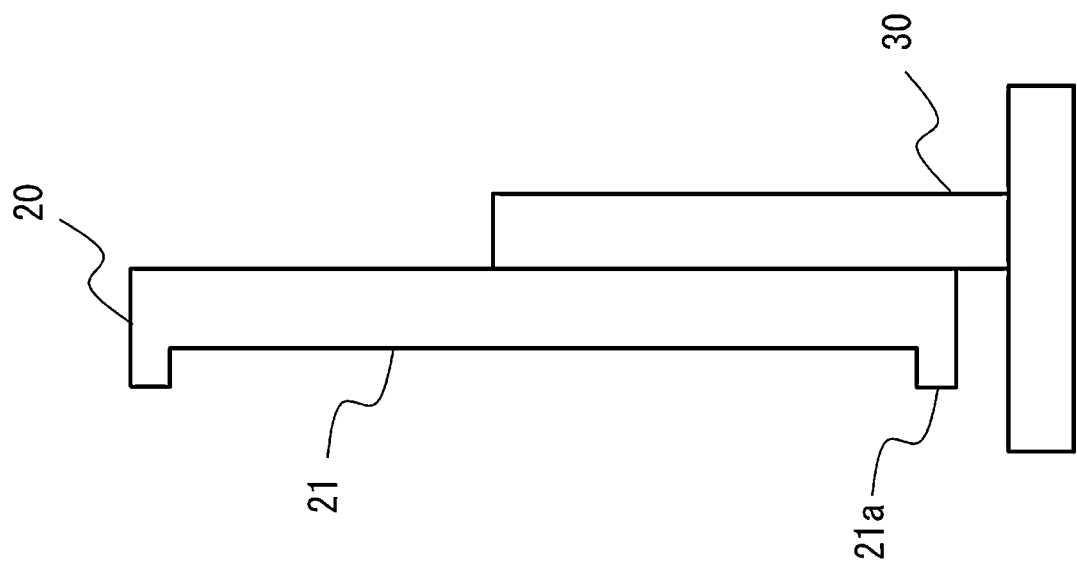
FIG. 2B is a cross section illustrating a configuration of a monitor apparatus according to the first embodiment.

FIG. 2A is a front exterior view of a monitor apparatus 20 according to the present embodiment, and FIG. 2B is the IIA-IIB cross section of the same. The monitor apparatus 20 according to the present embodiment is a display apparatus to be managed (to be evaluated) for monitor accuracy, and is a medical monitor that displays medical images, for example, but may otherwise be a monitor apparatus for DTP or the like.

As illustrated in FIGS. 2A and 2B, the monitor apparatus 20 is provided with a display screen 21 that is rectangular in a front view. The display screen 21 is a flat display panel such as an LCD panel or an OLED panel. The size of the display screen 21 is similar to that of a typical medical monitor and is around inches, for example, but is not particularly limited.

The monitor apparatus 20 is provided with a bezel 21*a* around the display screen 21, for example. The bezel 21*a* is a raised part that protrudes a few millimeters in the thickness direction past the display screen 21. At the perimeter of the display screen 21, the surface of the display screen 21 and the lateral surface of the bezel 21*a* form an angled part at substantially a right angle. As described later, the bezel 21*a* is a ledge on which the tablet terminal 10 is caught and placed when performing an evaluation of the monitor apparatus 20. Note that the monitor apparatus 20 may not be provided with the bezel 21*a*, and in this case, a ledge member for placing the tablet terminal 10 is preferably provided at the perimeter of the monitor apparatus 20.

The monitor apparatus 20 is supported by a stand 30 and is secured in a predetermined orientation such that the user can look at the display screen 21 in a stable manner. For example, the monitor apparatus 20 is secured by the stand 30 in a vertical orientation, that is, with the longitudinal direction perpendicular to the installation surface of the stand 30, but may also be secured in a horizontal orientation. The stand 30 allows the horizontal or vertical orientation of the monitor apparatus 20 to be changed, and also allows the tilt of the display screen 21 of the monitor apparatus 20 to be changed. The tilt of the display screen 21 is the tilt when the display screen 21 is rotated from the vertical direction to the horizontal direction, the rotation being centered on a central part of the display screen 21 supported by the stand 30, for example.

FIG. 3 illustrates a configuration example of a monitor accuracy management system 1 according to the present embodiment. As illustrated in FIG. 3, the monitor accuracy management system 1 is provided with a tablet terminal and a monitor apparatus 20. The monitor accuracy management system 1 is an evaluation system with which the tablet terminal 10 evaluates the image quality of the monitor apparatus 20. Note that the configurations in FIG. 3 are an example, and other configurations are possible insofar as a method according to the present embodiment can be achieved.

In addition to the display screen 12, the inward-facing camera 13, and the outward-facing camera 14 illustrated in FIGS. 1A and 1B, the tablet terminal 10 is provided with an interface (I/F) 15, a storage unit 16, and a control unit 100. The inward-facing camera 13 or outward-facing camera 14 is an image capture unit disposed on a surface of the housing 11 of the tablet terminal 10, and in the present embodiment, captures an image displayed on the display screen 21 in a state with the surface of the housing 11 placed in a position facing the display screen 21 of the monitor apparatus 20.

The I/F 15 is a communication unit for communicably connecting to the monitor apparatus 20, of which the connection method and the communication method are not particularly limited. The storage unit 16 is a non-volatile memory such as flash memory, a hard disk apparatus, or the like. The storage unit 16 stores programs and data necessary for operations by the tablet terminal 10, and for example, stores a monitor accuracy management program (software) for evaluating image quality, data necessary for the evaluation of image quality, and the like.

The control unit 100 is a control unit that controls operations by each unit of the tablet terminal 10, and is a program execution unit such as a central processing unit (CPU). The control unit 100 achieves each function (process) by reading out the monitor accuracy management program stored in the storage unit 16 and executing the read-out program.

For example, the control unit 100 includes a generation unit 101, an acquisition unit 102, and an evaluation unit 103 as functions to be achieved by the monitor accuracy management program. The generation unit 101 generates a predetermined test pattern to be displayed on the monitor apparatus 20, and transmits the generated test pattern to the monitor apparatus 20 through the I/F 15. The generation unit 101 may also acquire a test pattern stored in the storage unit 16. The acquisition unit 102 acquires an image captured by the inward-facing camera 13 or the outward-facing camera 14. In this example, an image capturing a test pattern displayed on the monitor apparatus 20 is acquired. The evaluation unit 103 evaluates the image quality of the monitor apparatus 20 based on the acquired image of the test pattern. The evaluation unit 103 evaluates the luminance of the image, for example, but is not limited to luminance and may also evaluate color.

In addition to the display screen 21 illustrated in FIGS. 2A and 2B, the monitor apparatus 20 is provided with an I/F 22, a storage unit 23, and a control unit 200. The display screen 21 is a display unit that displays a test pattern received from the tablet terminal 10. The I/F 22 communicably connects to the tablet terminal 10, similarly to the I/F 15 of the tablet terminal 10. The storage unit 16 stores programs and data necessary for operations by the monitor apparatus 20. For example, the storage unit 16 stores a look-up table (LUT) for converting input data into a display level for displaying a display screen. By changing the settings of the LUT according to an evaluation result, the image quality of the display screen 21 can be adjusted.

The control unit 200 is a control unit that controls operations by each unit of the monitor apparatus 20. For example, the control unit 200 receives a test pattern from the tablet terminal 10 through the I/F 22, and causes the received test pattern to be displayed on the display screen 21 at a display level that is based on the LUT.

Method of First Embodiment

Next, a monitor accuracy management method (evaluation method) according to the present embodiment using the tablet terminal 10 and the monitor apparatus 20 illustrated in FIGS. 1A and 1B to FIG. 3 will be described. FIG. 4A is a front exterior view of the monitor apparatus 20 illustrating a state in which the monitor accuracy management method according to the present embodiment is being carried out, and FIG. 4B is the IVA-IVB cross section of the same.

As illustrated in FIGS. 4A and 4B, in the present embodiment, when performing monitor accuracy management of the monitor apparatus 20, the tablet terminal 10 is overlaid onto the display screen 21 of the monitor apparatus 20. Specifically, the display screen 21 of the monitor apparatus 20 is secured by the stand 30 in a state of being tilted at an incline in the upward-facing direction (horizontal direction), and the tablet terminal 10 is placed onto the display screen 21. For example, the back side of the tablet terminal 10, where the outward-facing camera 14 is located, is placed onto the display screen 21.

With this arrangement, the bottom edge of the tablet terminal 10, or in other words the short end without the outward-facing camera 14, is in a state of being caught on the ledge of the bezel 21a, and since the end of the tablet terminal 10 abuts the bezel 21a while the entire back of the tablet terminal 10 abuts the display screen 21, the tablet terminal 10 is stationary on the display screen 21. At this time, the outward-facing camera 14 of the tablet terminal 10 is located near the center of the display screen 21. That is, the outward-facing camera 14 is secured in an abutting state near the center of the display screen 21.

If the monitor display accuracy management software is launched on the tablet terminal 10 in this state, a test pattern is transmitted from the tablet terminal 10 to the monitor apparatus 20 and the test pattern is displayed on the display screen 21 of the monitor apparatus 20. The tablet terminal 10 uses the outward-facing camera 14 to capture an image of the test pattern displayed near the center of the display screen 21, and evaluates the image quality of the captured image of the test pattern. Note that the test pattern may also be captured by the inward-facing camera 13 by placing the tablet terminal 10 reversed from front to back. Moreover, insofar as an image can be captured with the tablet terminal 10 in the placed state, a test pattern can be captured at any position on the display screen 21, without being limited to near the center of the display screen 21. For example, the tablet terminal 10 is not limited to a vertical orientation like in FIGS. 4A and 4B. The tablet terminal 10 may be placed in a horizontal orientation and capture an image below the center of the display screen 21.

Effects of First Embodiment

As described above, in the present embodiment, monitor accuracy management of a monitor apparatus is performed using a built-in camera of a tablet terminal on which monitor accuracy management software is installed. With this arrangement, the monitor accuracy management can be performed easily. Also, the management of a sensor for measuring the luminance or the like can be simplified, and the burden on the user during the measuring work can be reduced.

In general, a camera unit for shooting video is built into a tablet terminal. Furthermore, in many cases, two cameras referred to as an outward-facing camera and an inward-facing camera are installed on the back and the front, respectively, of a tablet terminal. In the present embodiment, the built-in camera of a tablet terminal is used in lieu of an external sensor to be used for monitor accuracy management. Typically, a tablet terminal is configured to have a thin, flat housing less than or equal to 1 cm with a smooth surface. Consequently, it is possible to place a tablet terminal in close contact with the display screen of a monitor apparatus to be managed for monitor accuracy, and with this arrangement, the built-in camera of the tablet terminal can be placed in close contact with the display screen of the monitor apparatus.

As the position for measuring the display characteristics of a monitor apparatus, the central part of the display screen is considered to be more satisfactory than the corners. The reason is that the effects of the uniformity of the display device can be mitigated. Typically, the screen size of a monitor apparatus and the size of a tablet terminal are approximately 2:1 in many cases. Furthermore, the camera of a tablet terminal is installed offset in a corner rather than in the housing center. In particular, the inward-facing camera is often installed in an edge portion of the housing on the outer side of the display screen. Consequently, in the case where the edge of a tablet terminal is placed so as to touch the bezel of a monitor apparatus, the built-in camera of the tablet terminal can be placed so as to be located in a central portion of the display screen of the monitor apparatus. This is favorable for screen measurement for monitor accuracy management, and measurements in the screen center can be taken easily.

Furthermore, in general, a monitor apparatus is often structured such that the display device referred to as the panel is covered by a frame-shaped housing referred to as a bezel. Therefore, the bezel portion protrudes slightly with respect to the panel surface in many cases. Also, in general, a monitor apparatus is mounted on a stand and has a structure allowing for fixed installation, and moreover, the stand has a vertical and horizontal tilt mechanism in many cases. By utilizing this mechanism to place the tablet terminal so as to touch the bezel of the monitor apparatus to be managed for monitor accuracy in a state with the display screen of the monitor apparatus tilted in the upward-facing direction, the tablet terminal can be held stably in a manner of being caught on the ledge portion of the bezel of the monitor apparatus. That is, the tablet terminal can be held in place stably on the display screen of the monitor apparatus, without being supported manually or with a tool. Note that the shape of the edge of the housing of the tablet terminal anticipated by the present embodiment is preferably a shape designed on the assumption of being easily caught and stably held on the ledge of the bezel of the monitor apparatus.

A monitor accuracy management system using a tablet terminal according to the present embodiment has advantages like the following compared to a technique using a radiology terminal on which monitor accuracy management software is installed and a special-purpose external sensor. Namely, the monitor accuracy management system includes only a single tablet terminal. With this configuration, the terminal, sensor, software, and the like are integrated, thereby enabling unified maintenance and management. Moreover, the sensor is not misplaced or the like, and the tablet terminal is lightweight and thus is easy to carry around. Furthermore, it is not necessary to install monitor accuracy management software on the radiology terminal, and malfunctions due to a conflict with other software do not occur.

In addition, system maintenance can also be performed easily. Before the application of the present embodiment, a serviceman would need to visit a site, or an administrator of the site would need to perform maintenance on their own. According to the present embodiment, for example, the monitor accuracy management system using the tablet terminal can be used to achieve a remote maintenance service. Moreover, it is also possible to send back the entire tablet terminal.

In particular, compared to the case of using a special-purpose external sensor, in the present embodiment, the tablet terminal can be placed on the display screen of the monitor apparatus and easily held at the measurement position. Furthermore, in the held state, the central part of the display screen of the monitor apparatus can be measured reliably by the built-in camera of the tablet terminal.

Second Embodiment

Next, the second embodiment will be described. The present embodiment describes an example in which, in addition to the configuration of the first embodiment, a video signal to be displayed on the monitor apparatus is transmitted wirelessly from the tablet terminal.

Overview of Second Embodiment

In the first embodiment, the measurement of the display characteristics of the monitor apparatus is performed by displaying a test pattern on the display screen of the monitor apparatus and using a camera (for example, the outward-facing camera) built into the tablet terminal to measure the display luminance (or color) of the pattern. The test pattern to be displayed on the display screen of the monitor apparatus needs to be varied in synchronization with a predetermined measurement sequence, and thus necessitates a mechanism by which the test pattern is displayed based on control by the tablet terminal on which monitor accuracy management software, which serves as the measuring entity, is installed. The simplest configuration is to connect the tablet terminal and the monitor apparatus in a wired manner, and input a video signal outputted from the tablet terminal into the monitor apparatus for display.

However, in general, a tablet terminal is not equipped with a terminal for video transmission similar to a High-Definition Multimedia Interface (HDMI (Registered Trademark)) port in many cases. Also, although a tablet terminal may be equipped with a Universal Serial Bus (USB) port, a USB video input terminal is not furnished on the monitor apparatus side in many cases. In recent years, tablet terminals provided with a USB Type-C terminal that supports video output as standard have appeared, but this cannot be said to be widespread to all.

Moreover, in the case where "the edge of a tablet terminal is placed so as to touch the bezel of a monitor apparatus" like in the first embodiment, if the external terminal of the tablet terminal is assumed to located on the edge portion touching the bezel of the monitor apparatus, a problem occurs in that a wired connection is difficult. Accordingly, in the present embodiment, a solution to the above problem is attained by connecting the tablet terminal and the monitor apparatus in a wireless manner and wirelessly transmitting a video signal.

Configuration of Second Embodiment

Figure 5:
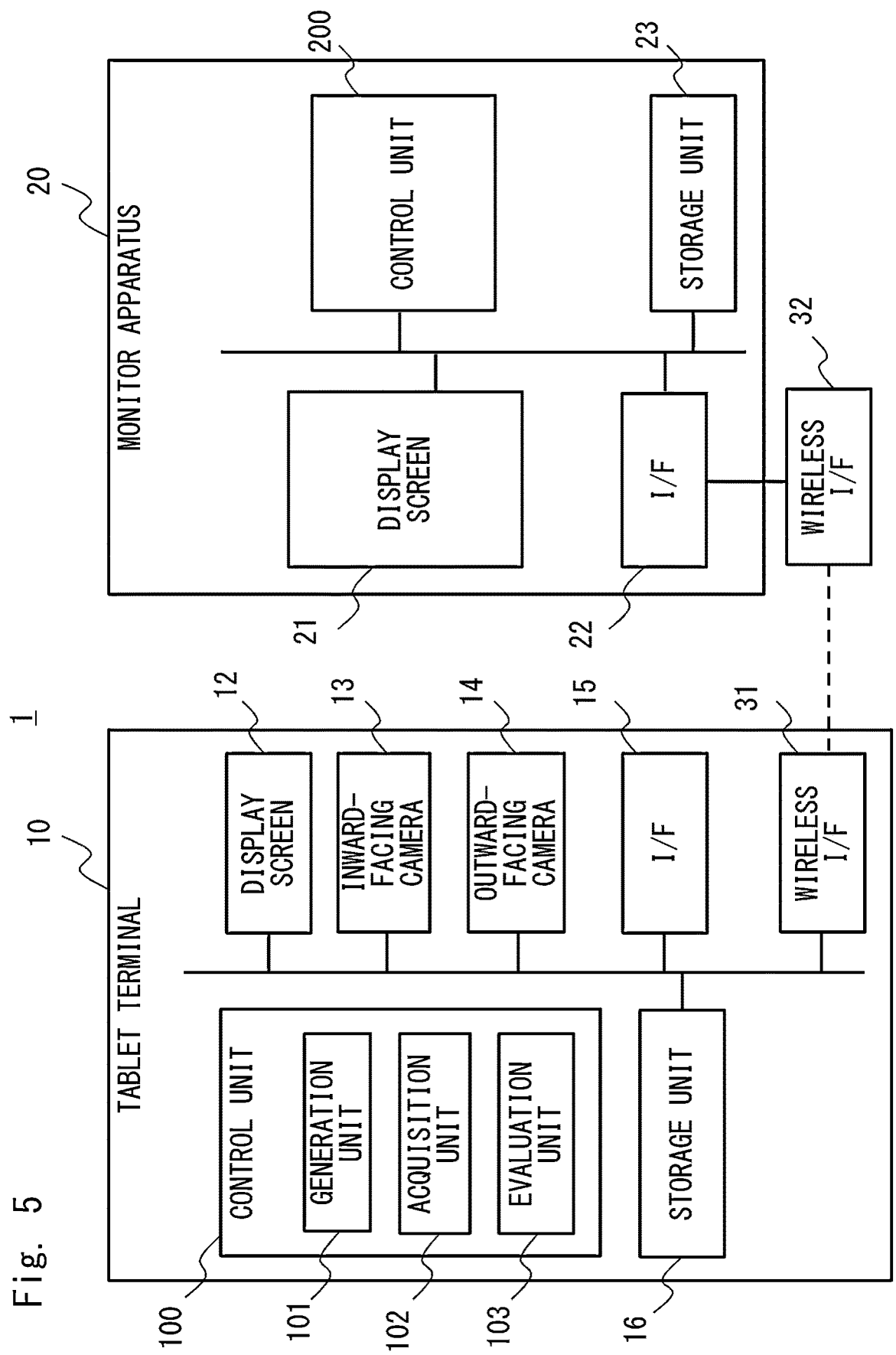
FIG. 5 is a configuration diagram illustrating a configuration of a monitor accuracy management system according to a second embodiment.

FIG. 5 illustrates a configuration example of a monitor accuracy management system 1 according to the present embodiment. As illustrated in FIG. 5, in the present embodiment, wireless I/Fs 31 and 32 are provided in addition to the configuration of the first embodiment.

For example, the wireless I/F 31 is built into the tablet terminal 10, and the wireless I/F 32 is an external adapter connected to the I/F 22 of the monitor apparatus 20. However, the configuration is not limited to the above, and the wireless I/F 32 may also be built into the monitor apparatus 20 while the wireless I/F 31 may be an adapter external to the tablet terminal 10.

The wireless I/Fs 31 and 32 are wireless video transmission apparatuses (wireless communication units) that wirelessly transmit a video signal between the tablet terminal 10 and the monitor apparatus 20. The wireless I/F 31 wirelessly transmits a video signal of a test pattern, which is a predetermined image generated by the tablet terminal 10, to the monitor apparatus 20, in this example to the wireless I/F 32 connected to the monitor apparatus 20. Also, the wireless I/F 32 wirelessly receives the video signal from the wireless I/F 31 of the tablet terminal 10, and inputs the received video signal into the monitor apparatus 20.

The wireless video transmission technology used in the wireless I/Fs 31 and 32 is not particularly limited and may be Miracast (Registered Trademark), for example. As one example, the wireless I/F 31 is a Miracast transmitter and the wireless I/F 32 is a Miracast receiver. Miracast transmission is supported as standard in many tablet terminals based on Android (Registered Trademark) OS, and moreover, many Miracast receivers are commercially available in general and may be used.

For example, the wireless I/F 32 which is a Miracast receiver is connected by an HDMI cable to the I/F 22 which is an HDMI terminal. In the case of using Miracast transmission, the wireless I/F 31 and the wireless I/F 32 establish a wireless connection using Wi-Fi (Registered Trademark) Direct, and a video signal is wirelessly transmitted from the wireless I/F 31 to the wireless I/F 32 over Wi-Fi. The wireless I/F 32 wirelessly receives the video signal from the wireless I/F 31 over Wi-Fi, and inputs the received video signal into the monitor apparatus 20 through the HDMI cable.

Note that the configuration is not limited to Miracast and another wireless video transmission function similar to Miracast, such as Apple TV (Registered Trademark) or Chromecast (Registered Trademark), may also be used. Furthermore, the configuration is not limited to Wi-Fi (wireless LAN), and Bluetooth (Registered Trademark) or the like may also be used to establish a wireless connection.

Method of Second Embodiment

Figure 6:
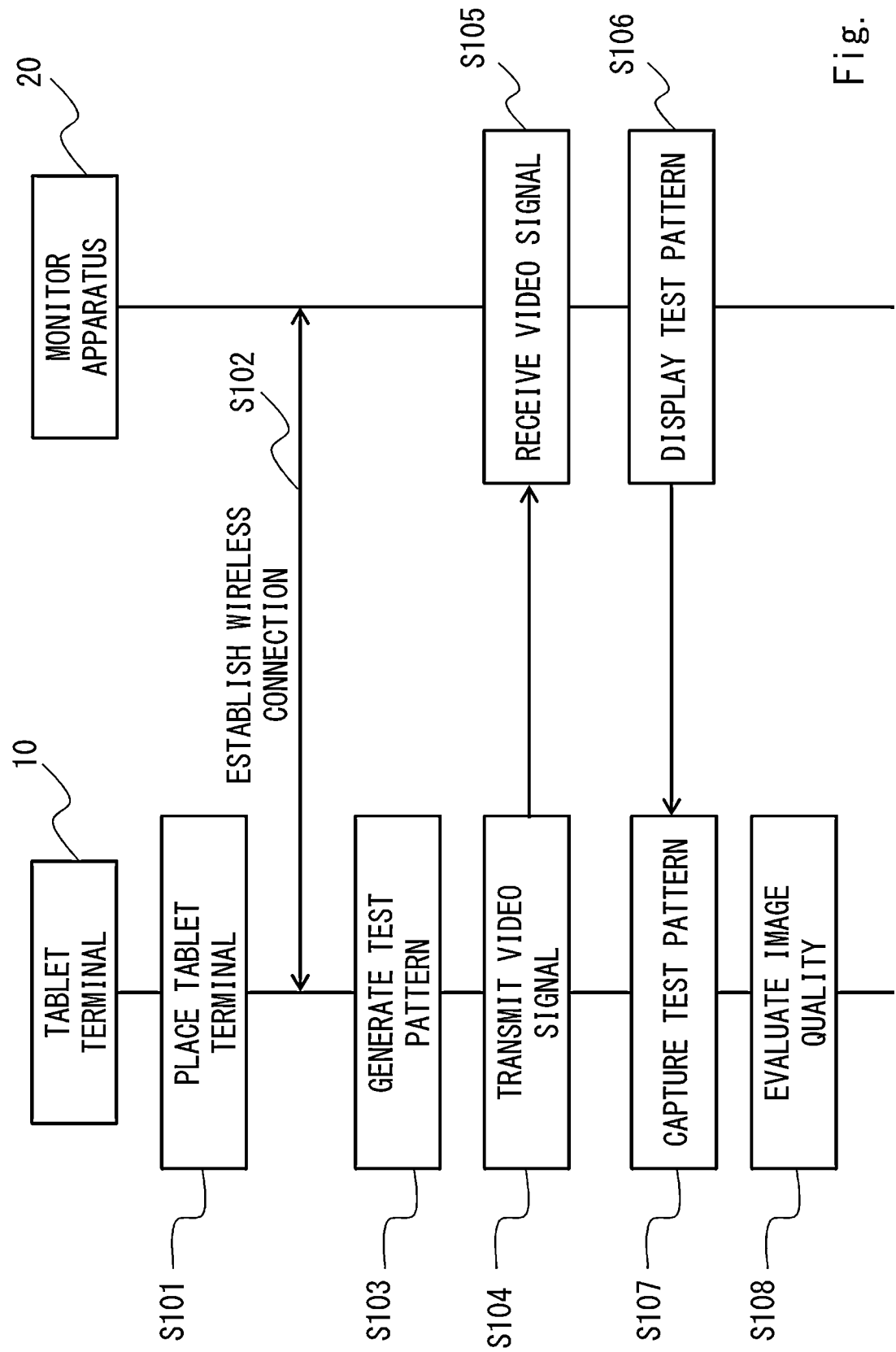
FIG. 6 is a sequence diagram illustrating a monitor accuracy management method according to the second embodiment.

FIG. 6 illustrates the flow of a monitor accuracy management method according to the present embodiment. As illustrated in FIG. 6, first, the tablet terminal 10 is placed at a predetermined position (S101). FIGS. 7A and 7B illustrate an example of the placement of the tablet terminal 10. As illustrated in FIGS. 7A and 7B, in the present embodiment, the wireless I/F 32 is connected to the monitor apparatus 20 by an HDMI cable or the like. Similarly to the first embodiment, the tablet terminal 10 is placed onto the display screen 21 of the monitor apparatus 20 to which the wireless I/F 32 is connected. In other words, in a state with the monitor apparatus 20 tilted at an incline, the edge of the tablet terminal 10 is placed so as to be caught on the bezel 21a of the monitor apparatus 20, and the outward-facing camera 14 of the tablet terminal 10 is secured near the center of the display screen 21.

Next, a wireless connection is established between the tablet terminal 10 and the monitor apparatus 20 (S102). For example, the wireless I/F 31 of the tablet terminal 10 and the wireless I/F 32 connected to the monitor apparatus 20 establish a wireless connection using Wi-Fi Direct.

Next, the tablet terminal 10 generates a test pattern (S103). For example, if the accuracy management software is launched on the tablet terminal 10, the generation unit 101 generates a predetermined test pattern to be displayed on the monitor apparatus 20.

Next, the tablet terminal 10 transmits a video signal of the generated test pattern (S104), and the monitor apparatus 20 receives the transmitted video signal (S105). For example, the wireless I/F 31 of the tablet terminal 10 wirelessly transmits the video signal of the test pattern over the connected Wi-Fi. The wireless I/F 32 wirelessly receives the video signal of the test pattern over the connected Wi-Fi, and inputs the received video signal into the I/F 22 of the monitor apparatus 20.

Next, the monitor apparatus 20 displays the test pattern on the display screen 21 (S106). When the video signal is inputted into the I/F 22, the control unit 200 of the monitor apparatus 20 displays the test pattern on the display screen 21 based on the inputted video signal. At this time, the test pattern is displayed at least in a position to be captured by the tablet terminal 10 (in this example, near the center of the display screen 21). For example, the tablet terminal 10 may specify the position where the test pattern is to be displayed. Note that the tablet terminal 10 may also be placed in accordance with the position where the test pattern is being displayed.

FIG. 8 illustrates an example of test patterns generated by the tablet terminal 10 and displayed on the monitor apparatus 20. The test patterns are patterns (JIRA BN-01 to BN-18) stipulated by the Quality Assurance (QA) Guideline for Medical Imaging Display Systems (JESRA X-0093*B-2017). The test patterns are patterns used in the measurement of luminance, and as illustrated in FIG. 8, include a measurement patch (a square region in the center) and a background. The measurement patches of the plurality of test patterns correspond to 18 grayscale gradations at equal intervals of 15 gradations in sequence from the 0 gradation to the 255 gradation, that is, from black to white. Video of the 18 test patterns is transmitted from the tablet terminal 10 and sequentially displayed in the center of the display screen 21 of the monitor apparatus 20.

Next, the tablet terminal 10 captures the test patterns displayed on the monitor apparatus 20 (S107). Like the first embodiment, the test patterns displayed on the display screen 21 are captured by the outward-facing camera 14 of the tablet terminal 10 in a state with the tablet terminal 10 placed onto the display screen 21 of the monitor apparatus 20. Since the outward-facing camera 14 is in close proximity to the display screen 21 at this time, image capture may be performed in a mode enabling closeup image capture, such as a macro mode, or the outward-facing camera 14 may be fitted with a macro lens. For example, the outward-facing camera 14 sequentially captures the measurement patches of the 18 test patterns in FIG. 8. Note that the tablet terminal 10 may also display the images captured by the outward-facing camera 14 on the display screen 12 of the tablet terminal 10.

Next, the tablet terminal 10 evaluates the image quality of the captured test pattern images (S108). For example, the acquisition unit 102 of the tablet terminal 10 acquires the images of the test patterns captured by the outward-facing camera 14, and the evaluation unit 103 evaluates the luminance and the like of the acquired images. Note that the tablet terminal 10 may also display evaluation results from the evaluation unit 103 on the display screen 12 of the tablet terminal 10.

Figure 9:
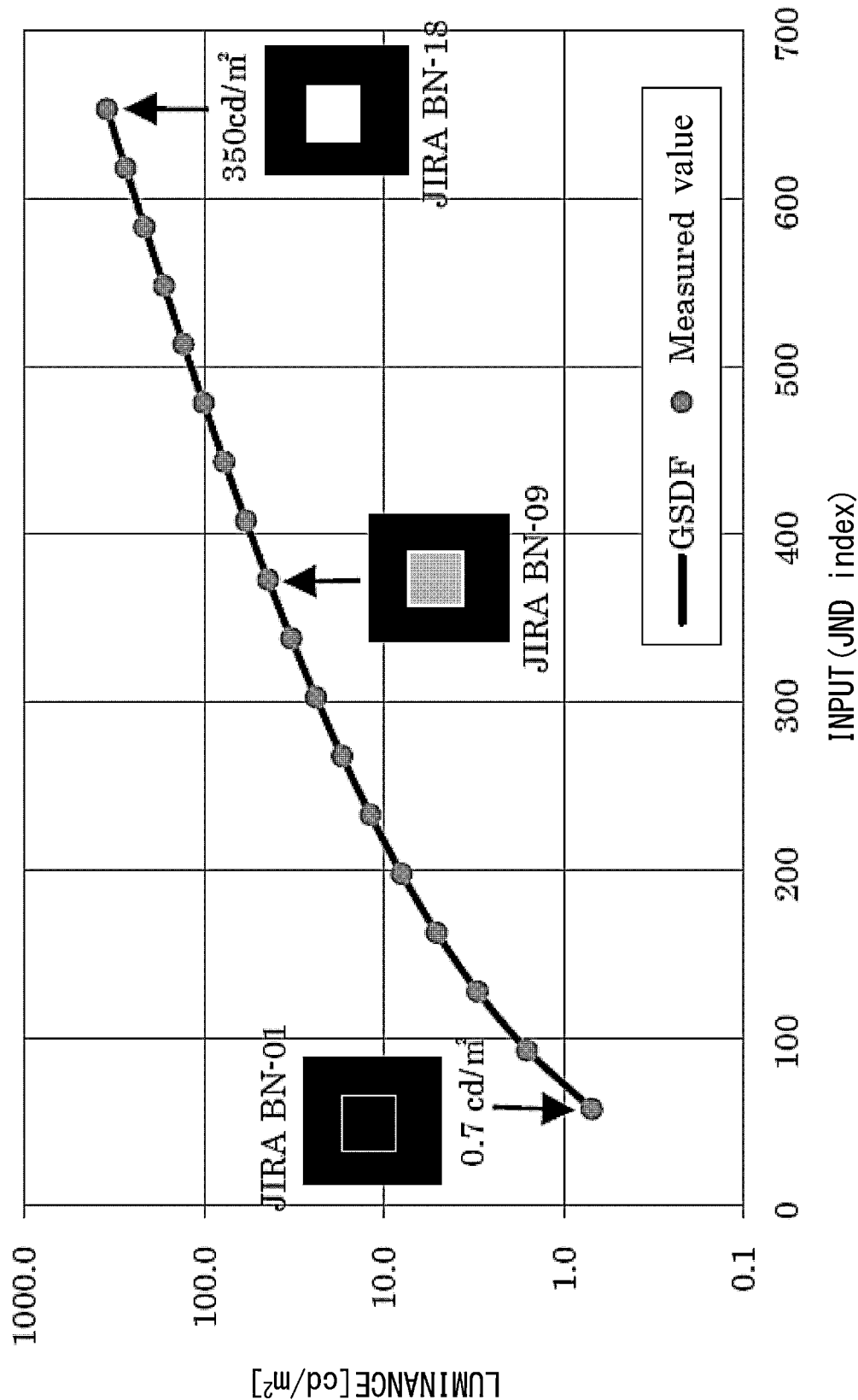
FIG. 9 is a diagram illustrating an example of luminance characteristics to be evaluated by a monitor accuracy management method according to the second embodiment.

FIG. 9 illustrates an example of luminance characteristics to be evaluated. The luminance characteristics are characteristics indicated in the Quality Assurance (QA) Guideline for Medical Imaging Display Systems (JESRA X-0093*B-2017). For example, in the case of a medical monitor, it is desirable to display images with grayscale characteristics conforming to the Grayscale Standard Display Function (GSDF) of the Digital Imaging and Communication in Medicine (DICOM) standard. The horizontal axis in FIG. 9 corresponds to the grayscale gradations of the test patterns generated by the tablet terminal 10 and displayed on the monitor apparatus 20. The vertical axis in FIG. 9 corresponds to the luminance of the display screen when certain grayscale gradations are displayed, and as illustrated in FIG. 9, the tablet terminal 10 compares the GSDF curve to the luminance measured when displaying the 18 test patterns. For example, the prescribed luminance characteristics of the GSDF curve are stored in the storage unit 16, and the stored luminance characteristics are compared to the measured values of the test patterns. If the difference between the GSDF curve and the measured values is inside a prescribed range, the image quality of the monitor apparatus 20 is determined to be appropriate, whereas if the difference is outside the prescribed range, the image quality of the monitor apparatus 20 is determined to be inappropriate. Note that the evaluation is not limited to grayscale gradation characteristics, and luminance uniformity, contrast, maximum luminance, luminance ratio, chromaticity, and the like may also be evaluated.

Effects of Second Embodiment

As described above, in the present embodiment, a video signal of a test pattern to be displayed on the monitor apparatus is transmitted wirelessly from the tablet terminal in the configuration of the first embodiment. With this arrangement, the tablet terminal and the monitor apparatus do not need to be connected in a wired manner, and the connection can be made less cumbersome. In particular, since there are no restrictions due to the location and shape of an external terminal, the video signal of a test pattern can be wirelessly transmitted reliably in the state in which "the edge of a tablet terminal is placed so as to touch the bezel of a monitor apparatus" as in the first embodiment, and the image quality of the monitor apparatus can be evaluated.

Third Embodiment

Next, the third embodiment will be described. The present embodiment describes an example in which, in addition to the configuration of the first and second embodiments, an image displayed on the monitor apparatus is used to perform pairing setup.

Overview of Third Embodiment

In general, pieces of equipment need to be paired to each other when wirelessly connecting and managing the pieces of equipment. In the case of a wired connection, the pairing between the connected pieces of equipment is self-evident, but in the case of a wireless connection, all pieces of equipment existing within the wireless radio wave coverage may be candidates for communication. In the case where a wireless connection is established between a medical monitor to be managed and a tablet terminal like in the second embodiment, it is anticipated that the system will be used in an environment such as a radiology room. In this case, there is a strong possibility that a plurality of monitor apparatuses installed in the radiology room are to be managed with respect to a single tablet terminal. For this reason, an explicit pairing operation performed by a user operation is necessary, and the burden on the user is large.

Accordingly, in the present embodiment, a solution to the above problem is attained by providing a mechanism such that when the tablet terminal is placed on a monitor apparatus to be managed, the two are paired automatically.

Configuration of Third Embodiment

Figure 10:
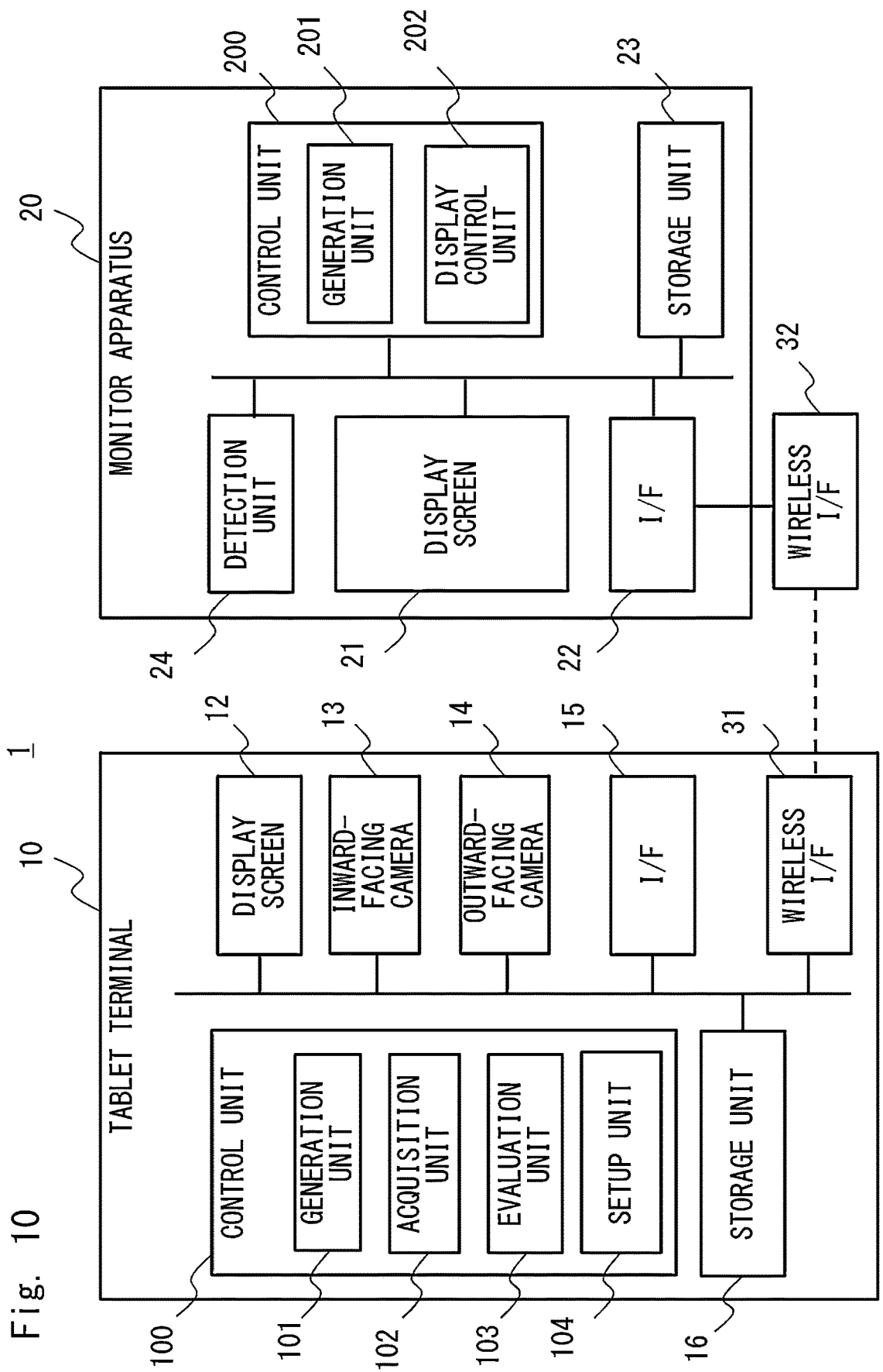
FIG. 10 is a configuration diagram illustrating a configuration of a monitor accuracy management system according to a third embodiment.

FIG. 10 illustrates a configuration example of a monitor accuracy management system 1 according to the present embodiment. As illustrated in FIG. 10, in the present embodiment, in addition to the configuration of the second embodiment, the monitor apparatus 20 is provided with a detection unit 24 and the control unit 200 is provided with a generation unit 201 and a display control unit 202.

The detection unit 24 detects that the tablet terminal 10 has been placed onto the display screen 21. As the detecting means of the detection unit 24, mechanical means such as a switch may be used, but sensing means using an optical, electrical, or magnetic sensor may also be used.

The generation unit 201 generates a display pattern to be displayed on the display screen 21. For example, the generation unit 201 acquires a distinguishing ID of the wireless I/F 32 and generates a blink pattern that is based on the distinguishing ID. The distinguishing ID of the wireless I/F 32 may be stored in the storage unit 23. In this example, the distinguishing ID is identification information of the wireless I/F 32 and also identification information of the monitor apparatus 20. Note that the pattern is not limited to a blink pattern, and an image pattern that is based on the distinguishing ID may also be generated.

The display control unit (display unit) 202 displays the generated display pattern on the display screen 21 in the case where the placement of the tablet terminal 10 has been detected. For example, the display control unit 202 displays a predetermined image according to the generated blink pattern. The image to be displayed may be a test pattern or some other image. Moreover, the display is not limited to a blinking display that is based on the distinguishing ID, and an image pattern that is based on the distinguishing ID may also be displayed.

In the tablet terminal 10, in addition to the configuration of the second embodiment, the control unit 100 is provided with a setup unit 104. The setup unit 104 performs pairing setup using the distinguishing ID of the monitor apparatus 20 acquired from the display pattern displayed on the display screen 21 of the monitor apparatus 20. Pairing setup is setup for identifying the wireless I/F of the connecting entity and enabling wireless communication, and is also setup for identifying the monitor apparatus 20 to be managed and enabling management. In other words, the setup unit 104 is an identification unit that identifies the wireless I/F of the connecting entity (a monitor apparatus) and also identifies the monitor apparatus 20 to be managed (to be evaluated), based on the acquired distinguishing ID. Also, in the present embodiment, the acquisition unit 102 acquires the distinguishing ID of the monitor apparatus 20 based on a display pattern captured by the inward-facing camera 13 or outward-facing camera 14. The generation unit 101 transmits a generated test pattern to the monitor apparatus 20 set (identified) by the setup unit 104. The evaluation unit 103 evaluates the image quality of the monitor apparatus 20 set by the setup unit 104.

Method of Third Embodiment

Figure 11:
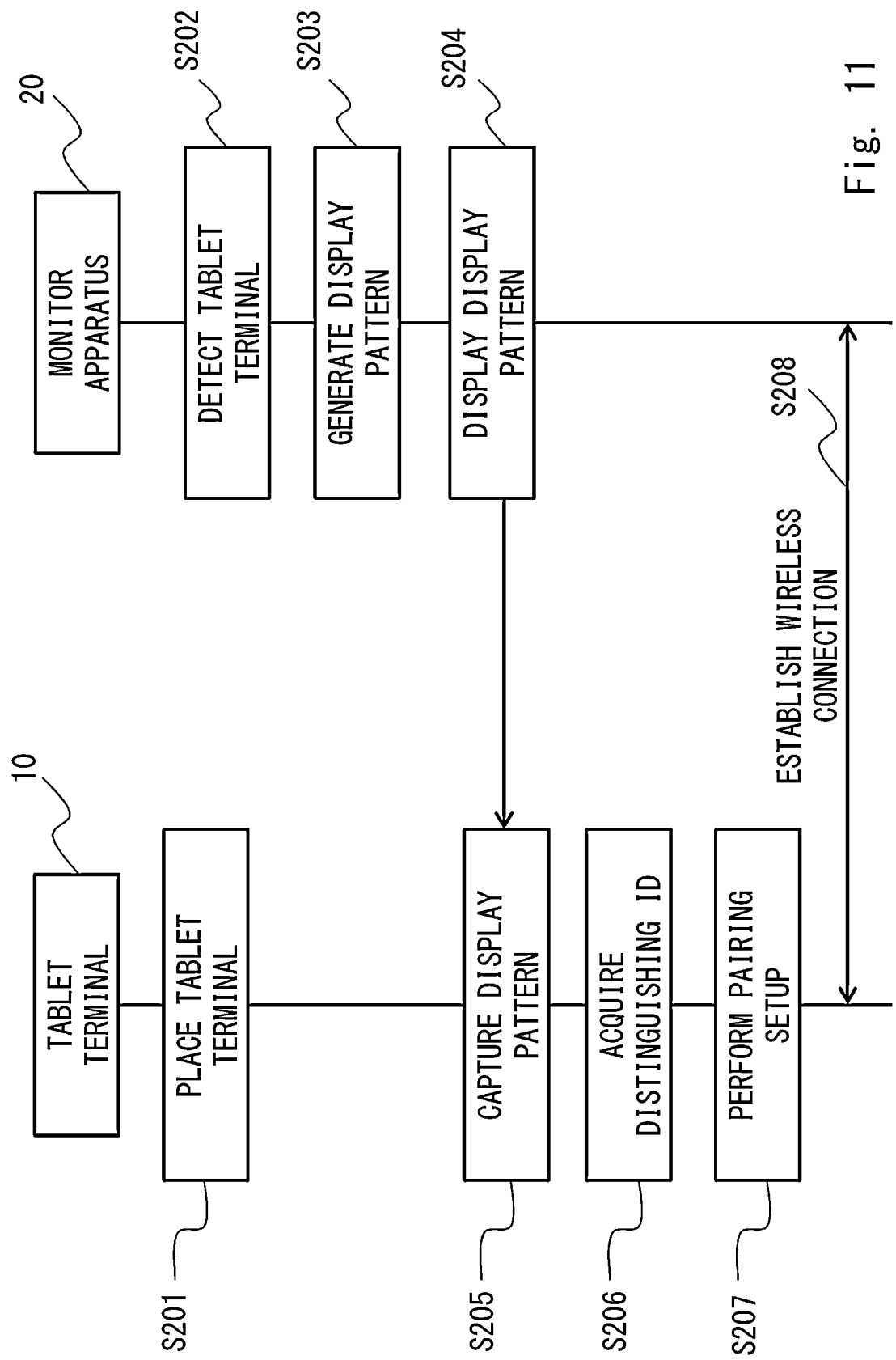
FIG. 11 is a sequence diagram illustrating a pairing method according to the third embodiment.

FIG. 11 illustrates the flow of a pairing method according to the present embodiment. The method is an evaluation management method for identifying and managing the monitor apparatus 20 by pairing the tablet terminal 10 and the monitor apparatus 20. As illustrated in FIG. 11, first, if the tablet terminal 10 is placed at a predetermined position (S201), the monitor apparatus 20 detects the placement of the tablet terminal 10 (S202). Similarly to the first and second embodiments, the tablet terminal 10 is placed onto the display screen 21 of the monitor apparatus 20. Then, the detection unit 24 of the monitor apparatus 20 detects that the tablet terminal 10 has been placed onto the display screen 21.

Next, the monitor apparatus 20 generates a display pattern to be displayed on the display screen 21 (S203). Upon detecting that the tablet terminal 10 has been placed onto the display screen 21, the generation unit 201 acquires the distinguishing ID of the wireless I/F 32 connected to the I/F 22, encodes the acquired distinguishing ID according to a predetermined algorithm, and generates a blink pattern or image pattern that is based on the distinguishing ID. Note that the above is not limited to the case in which the placement of the tablet terminal 10 has been detected, and a display pattern may also be generated and displayed at a timing in response to a user operation or the like. For example, a display pattern may be generated at any timing before the tablet terminal 10 is placed onto the display screen 21, and upon detecting that the tablet terminal 10 has been placed onto the display screen 21, the generated display pattern may be displayed.

Next, the monitor apparatus 20 displays the generated display pattern on the display screen 21 (S204). The display control unit 202 displays a predetermined image such as a test pattern on the display screen 21 and causes the image to blink according to the generated blink pattern. In other words, the luminance is modulated by a blink pattern that is based on the distinguishing ID, which causes the image to blink in accordance with the modulated luminance. Alternatively, the display control unit 202 displays an image pattern such as a two-dimensional barcode that is based on the distinguishing ID, on the display screen 21.

Next, the tablet terminal 10 captures the displayed display pattern (S205), and acquires the distinguishing ID of the monitor apparatus 20 (S206). Like the first and second embodiments, the outward-facing camera 14 of the tablet terminal captures the display pattern displayed on the display screen 21 in a state with the tablet terminal 10 placed onto the display screen 21. Then, the acquisition unit 102 acquires the display pattern captured by the outward-facing camera 14 and decodes the acquired display pattern. For example, by decoding (luminance demodulating) the blink pattern or image pattern of the predetermined image that has been captured, the distinguishing ID of the wireless I/F 32 connected to the monitor apparatus 20 is acquired.

Next, the tablet terminal 10 performs pairing setup based on the acquired distinguishing ID (S207). The setup unit 104 uses the acquired distinguishing ID of the wireless I/F 32 to set up pairing with the monitor apparatus 20 to be managed. Thereafter, similarly to the second embodiment, the tablet terminal 10 establishes a wireless connection with the wireless I/F 32 of the monitor apparatus 20 that has undergone pairing setup (S208), and makes an image quality evaluation of the monitor apparatus 20. In other words, the tablet terminal 10 transmits a test pattern to the monitor apparatus 20 that has undergone pairing setup and identified and evaluates the image quality of the monitor apparatus 20 displaying the transmitted test pattern.

Effects of Third Embodiment

As above, in the present embodiment, an image displayed on the monitor apparatus is used to perform pairing setup in the configuration of the first and second embodiments. With this arrangement, pairing can be executed without involving a user operation, simply by placing the tablet terminal on the display screen of the monitor apparatus. Consequently, in the case where the tablet terminal manages a plurality of monitor apparatuses, the monitor apparatus to be managed can be identified automatically to establish a wireless connection and perform the evaluation process.

Note that the present invention is not limited to the above embodiments, and appropriate modifications are possible within a scope that does not depart from the gist.

Each configuration in the embodiments described above may include hardware, software, or both, may include a singular piece of hardware or software, or may include plural pieces of hardware or software. The functions (processes) of each apparatus may be achieved by a computer including a CPU, memory, and the like. For example, programs for performing the method according to an embodiment may be stored in a storage apparatus, and each of the functions may be achieved by executing the programs stored in the storage apparatus on a CPU.

These programs may be stored and supplied to a computer by using a non-transitory computer-readable medium of any type. The non-transitory computer-readable medium includes a tangible storage medium of any type. Examples of the non-transitory computer-readable medium include a magnetic recording medium (for example, a flexible disk, magnetic tape, or a hard disk drive), a magneto-optical recording medium (for example, a magneto-optical disc), Compact Disc—Read-Only Memory (CD-ROM), CD-R, CD-R/W, and semiconductor memory (for example, mask ROM, programmable ROM (PROM), erasable PROM (EPROM), flash ROM, or random-access memory (RAM)). Additionally, the program may also be supplied to the computer by a transitory computer readable medium of any type. Examples of the transitory computer readable medium include electrical signals, optical signals, and electromagnetic waves. The transitory computer readable medium can supply the program to the computer through a wired communication channel such as an electric cable or an optical fiber, or through a wireless communication channel.

According to the embodiments, it is possible to provide an evaluation system and an evaluation management method that can identify a display apparatus in the case of evaluating the image quality of the display apparatus without using a special-purpose external sensor. Moreover, according to the embodiments, it is possible to provide a terminal apparatus and an evaluation method that can evaluate the image quality of a display apparatus without using a special-purpose external sensor.

The present invention can be favorably applied to a terminal apparatus that evaluates the image quality of a display apparatus.

What is claimed is:

1. An evaluation system comprising a display apparatus and a terminal apparatus,
   the display apparatus comprising:
      a generation unit configured to generate a display pattern that is based on identification information of the display apparatus; and
      a display unit configured to display the generated display pattern on a display screen,
   the terminal apparatus comprising:
      an image capture unit which is disposed on a surface of a housing of the terminal apparatus and which is configured to capture the display pattern displayed on the display screen in a state with the surface of the housing placed onto the display screen of the display apparatus;
      an acquisition unit configured to acquire the identification information of the display apparatus based on the captured display pattern;
      an identification unit configured to use the acquired identification information to identify the display apparatus to be managed; and
      an evaluation unit configured to evaluate an image quality of the identified display apparatus based on a predetermined image captured by the image capture unit, wherein
   the display apparatus further comprises a detection unit configured to detect that the housing of the terminal apparatus has been placed onto the display screen, and
   the display unit is configured to display the display pattern in a case in which the detection unit has detected that the housing of the terminal apparatus has been placed onto the display screen.

2. The evaluation system according to claim 1, wherein
   the generation unit is configured to generate a blink pattern based on the identification information, and
   the display unit is configured to display the predetermined image in a blinking manner according to the generated blink pattern.

3. The evaluation system according to claim 1, wherein
   the generation unit is configured to generate an image pattern based on the identification information, and
   the display unit is configured to display the generated image pattern.

4. An evaluation management method for an evaluation system comprising a display apparatus and a terminal apparatus, wherein
   the display apparatus:
      generates a display pattern that is based on identification information of the display apparatus; and
      displays the generated display pattern on a display screen,
   the terminal apparatus:
      captures, with an image capture unit disposed on a surface of a housing of the terminal apparatus, the display pattern displayed on the display screen in a state with the surface of the housing placed onto the display screen of the display apparatus;
      acquires the identification information of the display apparatus based on the captured display pattern;
      uses the acquired identification information to identify the display apparatus to be managed; and
      evaluates an image quality of the identified display apparatus based on a predetermined image captured by the image capture unit,
   the display apparatus further detects that the housing of the terminal apparatus has been placed onto the display screen, and
   displays the display pattern in a case of detecting that the housing of the terminal apparatus has been placed onto the display screen.

* * * * *